United States Patent
Mitomi et al.

(10) Patent No.: US 7,660,506 B2
(45) Date of Patent: Feb. 9, 2010

(54) OPTICAL WAVEGUIDE STRUCTURES

(75) Inventors: Osamu Mitomi, Nagoya (JP); Yuichi Iwata, Nagoya (JP); Jungo Kondo, Nishikamo-Gun (JP); Kenji Aoki, Ichinomiya (JP); Tetsuya Ejiri, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/750,515

(22) Filed: May 18, 2007

(65) Prior Publication Data
US 2007/0269176 A1    Nov. 22, 2007

(30) Foreign Application Priority Data
May 19, 2005  (JP) .............................. 2006-140099

(51) Int. Cl.
  *G02B 6/10* (2006.01)
(52) U.S. Cl. ........................... 385/129; 385/14; 385/15; 385/132
(58) Field of Classification Search ............. None
  See application file for complete search history.

(56) References Cited

U.S. PATENT DOCUMENTS

| 6,130,969 | A | 10/2000 | Villeneuve et al. |  |
| 7,123,804 | B2 * | 10/2006 | Baba et al. | ................... 385/129 |
| 7,181,120 | B2 * | 2/2007 | Sugitatsu et al. | ............ 385/131 |
| 2002/0118941 | A1 | 8/2002 | Notomi et al. |  |
| 2005/0152659 | A1 | 7/2005 | Baba et al. |  |
| 2005/0265660 | A1 * | 12/2005 | Miller | ........................ 385/43 |
| 2005/0281524 | A1 * | 12/2005 | Mouli | ........................ 385/129 |
| 2006/0018594 | A1 * | 1/2006 | Sugitatsu et al. | ............. 385/27 |
| 2007/0009219 | A1 | 1/2007 | Hatsuda et al. |  |

FOREIGN PATENT DOCUMENTS

| DE | 102 56 263 A1 | 7/2004 |
| EP | 1 219 984 A2 | 7/2002 |
| JP | 2002-350657 A1 | 12/2002 |
| JP | 2003-156642 A1 | 5/2003 |
| JP | 2004-037587 | 2/2004 |
| JP | 2005-070163 A1 | 3/2005 |
| JP | 2005-172932 A1 | 6/2005 |
| WO | WO 98/57207 A1 | 12/1998 |

OTHER PUBLICATIONS

Yoshinori Tanaka et al., "*2D PC Slab Add/Drop Filter Integrated with Polarization Mode Converter*," The 53rd Applied Physics Related Associated Lectures Proceedings (2006, Spring, at Musashi Kogyo University), pp. 1121, 23a-L-4.

(Continued)

*Primary Examiner*—Tina M Wong
(74) *Attorney, Agent, or Firm*—Burr & Brown

(57) ABSTRACT

An optical waveguide structure has a slab type photonic crystal and an optical waveguide provided in the photonic crystal. The photonic crystal has a slab of a dielectric film and a plurality of lattice columns each having dielectric pillars. The dielectric pillars included in the lattice columns at least in n'th order (n represents 1, 2, 3, 4 and 5) in distance with respect to said optical waveguide, respectively, has a planar shape of an equilateral polygon or exact circle. At least one of the dielectric pillars included in the lattice columns at least in n'th order (n represents 2, 3, 4 and 5) with respect to the optical waveguide has a size $r_n$ different from a fundamental size $r_0$.

7 Claims, 13 Drawing Sheets

OTHER PUBLICATIONS

Kono et al., *Finite Element Method for Nonreciprocal Optical Waveguide Discontinuity Problems and Analysis of Optical Isolators Using Magneto-Photonic Crystal Waveguide*, Journal of IEICE, C, vol. J87-C No. 1, pp. 123-131, Jan. 2004.

"*Extremely Large Group-Velocity Dispersion of Line-Defect Waveguides in Photonic Crystal Stabs,*" 2001 The American Physical Society, Physical Review Letters, vol. 87, No. 25.

U.S. Appl. No. 11/842,327, filed Aug. 21, 2007, Mitomi, Osamu.

\* cited by examiner

OPTICAL WAVEGUIDE STRUCTURES

This application claims the benefit of Japanese Patent Application P 2006-140099 filed on May 19, 2006, the entirety of which is incorporated by reference.

BACKGROUND OF THE INVENTION

1. Field of the Invention

The present invention relates to an optical waveguide structure utilizing a slab-type and two-dimensional photonic crystal.

2. Related Art Statement

An optical device utilizing a photonic crystal has a structure of repeating different kinds of dielectric materials having different dielectric constants. According to such devices, the internal multiple reflection phenomenon is utilized to provide various kinds of devices having superior functions and of very small sizes. Since the principle of function of the device is based on multiple reflection phenomenon, the device properties have a strong dependency on frequency (wavelength) in the vicinity of a specific frequency. The frequency is decided upon the material (refractive index N) of a substrate for a photonic crystal and a length d of period of repetition of the photonic crystal structure. The dependency of the device on frequency is characteristic to the device. However, in the case that the device is used in a wide range of wavelength, the characteristics would turn to be a defect.

An optical waveguide utilizing a slab-type and two-dimensional photonic crystal is described, for example, in the following documents.

Japanese patent publication No. 2005-172932A
Japanese patent publication No. 2003-156642A
Japanese patent publication No. 2005-70163A
Japanese patent publication No. 2002-350657A
The 53'th Applied Physics Related Associated Lectures; Proceedings; (2006, Spring, at Musashi Kogyo University) page 1121, 23a-L-4
"2D PC Slab add/Drop Filter Integrated with Polarization Mode Converter" authored by Yoshinori TANAKA et. al.
Journal of IEICE, C, Vol. J87-C No. 1 pages 12 3~131, January, 2004, "Finite element Method for Nonreciprocal Optical Waveguide_Discontinuity Problems and Analysis of Optical Isolators Using Magneto-Photonic Crystal Waveguide" authored by Kono et. al.
2001 The American Physical Society [PHYSICAL REVIEW LETTERS] Vol. 87, No. 25 [Extremely Large Group-Velocity dispersion of Line-Defect Waveguides in Photonic Crystal Stabs]

SUMMARY OF THE INVENTION

For example, an optical waveguide structure of a two-dimensional and triangular lattice photonic crystal, as schematically shown in FIG. 1, can be manufactured relatively easily and its practical applications have been studied. The optical retardation and effective electro-optic properties of this type of device are exemplified in FIGS. 3 to 6. The electro-optic properties shown below are amounts of change of equivalent refractive index of guided light wave caused by change of refractive index of a dielectric substrate.

FIG. 3 shows band property (waveguide mode) of a conventional triangular lattice type photonic crystal. It is, however, provided that its dielectric substrate is made of x-cut single crystal of lithium niobate. Even mode, TE mode light, a length d of period of 0.425 µm, ro/d of 0.35 and W/Wo of 1.0 are applied. The vertical axis is a normalized wave number NF, and the horizontal axis is a normalized wave number WN. The even mode within the photonic band (NF is about 0.39 to 0.47) is "PC-1 mode" or "PC-2 mode", shown in FIG. 3. The photonic band corresponds with a basic mode in a conventional waveguide. The band width and mode properties of the photonic band are changed depending on the material (refractive index of the substrate) and the size ro of empty holes.

FIG. 4 is an enlarged view of the PC-1 mode shown in FIG. 3. Further, FIG. 5 shows the dependency of the group refractive index GNeff on wavelength λ of the PC-1 mode shown in FIG. 3. FIG. 6 shows the dependency of effective EO constant on wavelength λ.

As the slope of the band property (first-order derivative: referred to as "δNF1") in FIG. 4 is smaller, the group refractive index GNeff and effective EO constant of the waveguide property are elevated.

Further, as can be seen from FIGS. 3 and 4, the second-order derivative of the dependency of NF on WN (referred to as "δNeff") was proved to be about zero in the case that WN is 0.3 or lower. The dependency of GNeff and effective EO constant on wavelength are thus small. However, as WN becomes 0.3 or larger, "δNF2" takes a positive value. In other words, the absolute value |δNF1| of "δNF1" becomes gradually small. In this case, as the wavelength λ becomes longer, GNeff and effective refractive index are monotonously increased.

As can be seen from FIGS. 5 and 6, the group refractive index GNeff and effective electro-optic (EO) constant become very large, especially in the vicinity of the end of the photonic band in the side of longer wavelength. The properties proved to be considerably different responsive to a slight change of wavelength at the same time. In other words, in a region that the group refractive index GNeff and effective electro-optic (EO) constant are large, the dependency of these properties on wavelength becomes also considerable. It is thus difficult to use such device in a wide band.

An object of the present invention is to obtain superior properties as a photonic crystal, to reduce the dependency on wavelength and to provide an optical functional device applicable in a wide frequency band, in an optical waveguide structure provided in a slab-type and two dimensional photonic crystal having a dielectric film slab and a plurality of lattice columns each formed by dielectric pillars.

A first invention provides an optical waveguide structure comprising a slab type two-dimensional photonic crystal and an optical waveguide provided in the photonic crystal. The photonic crystal has a slab of a dielectric film and a plurality of lattice columns each comprising dielectric pillars. The dielectric pillars included in the lattice columns at least of n'th order (n represents 1, 2, 3, 4 and 5) in distance with respect to the optical waveguide has a planar shape of an equilateral polygon or exact circle. At least one of the dielectric pillars included in the lattice columns at least of n'th order (n represents 2, 3, 4 and 5) in distance with respect to the optical waveguide has a size rn different from a fundamental size ro.

A second invention provides an optical waveguide structure comprising a slab type photonic crystal and an optical waveguide provided in said photonic crystal. The photonic crystal has a slab of a dielectric film and a plurality of lattice columns each comprising dielectric pillars. The dielectric pillars included in the lattice columns at least of n'th order (n represents 1, 2, 3, 4 and 5) in distance with respect to the optical waveguide has a planar shape of an equilateral polygon or exact circle. At least one of the dielectric pillars contained in the lattice columns at least in n'th order (n represents 1, 2, 3, 4 and 5) in distance with respect to the optical waveguide has a size rn different from a fundamental size ro.

The optical waveguide has a width W different from a fundamental pitch Wo of the lattice columns.

The inventors have researched the electric field distribution of guided light in a slab-type two-dimensional photonic device in detail. As a result, it was found that the modes of spreading of light, at different wavelengths, from an optical waveguide region to the outside are difference from each other.

Specifically, as shown in FIG. 7, light wave is concentrated in the vicinity of optical waveguide (core) portion at a short wavelength region of photonic gap ($\lambda=0.95$ in FIG. 7), and does not substantially spread to the outside. At a medium wavelength region ($\lambda=1.00$ µm), the confinement of light is relatively weak and the light spreads to the periphery of the device. At a long wavelength region ($\lambda=1.03$ µm), it is proved that the light spreads further toward the outer side of the device from the core portion.

On the other hand, the intensity of light becomes weaker as it is more distant from the core portion. However, the intensity of light in void portion is stronger than that in non-void portion. Therefore, the mode of spreading of light in the outside of the core portion is changed depending on the size of the void. It was thus found that the distribution of optical intensity can be changed by applying this principle and, specifically, by appropriately changing the void size in the vicinity of the core portion. It was also proved that the dependency of properties, such as propagation constant (equivalent refractive index Neff), of guided light can be controlled by utilizing this phenomenon.

That is, under the condition that the planar shape of dielectric pillar is an equilateral polygon or exact circle, it was found that the above dependency of wavelength can be reduced by making at least one of sizes rn (n=2, 3, 4 and 5) included in lattice columns of n'th order with respect to an optical waveguide different from a fundamental size ro.

Further, under the condition that the planar shape of dielectric pillar is an equilateral polygon or exact circle, it was found that the above dependency of wavelength can be reduced by making at least one of sizes rn (n=1, 2, 3, 4 and 5) included in lattice column of n'th order with respect to an optical waveguide different from a fundamental size ro and by making the width W of the waveguide different from a fundamental pitch Wo of the lattice columns.

PREFERRED EMBODIMENTS OF THE INVENTION

Figure 1:
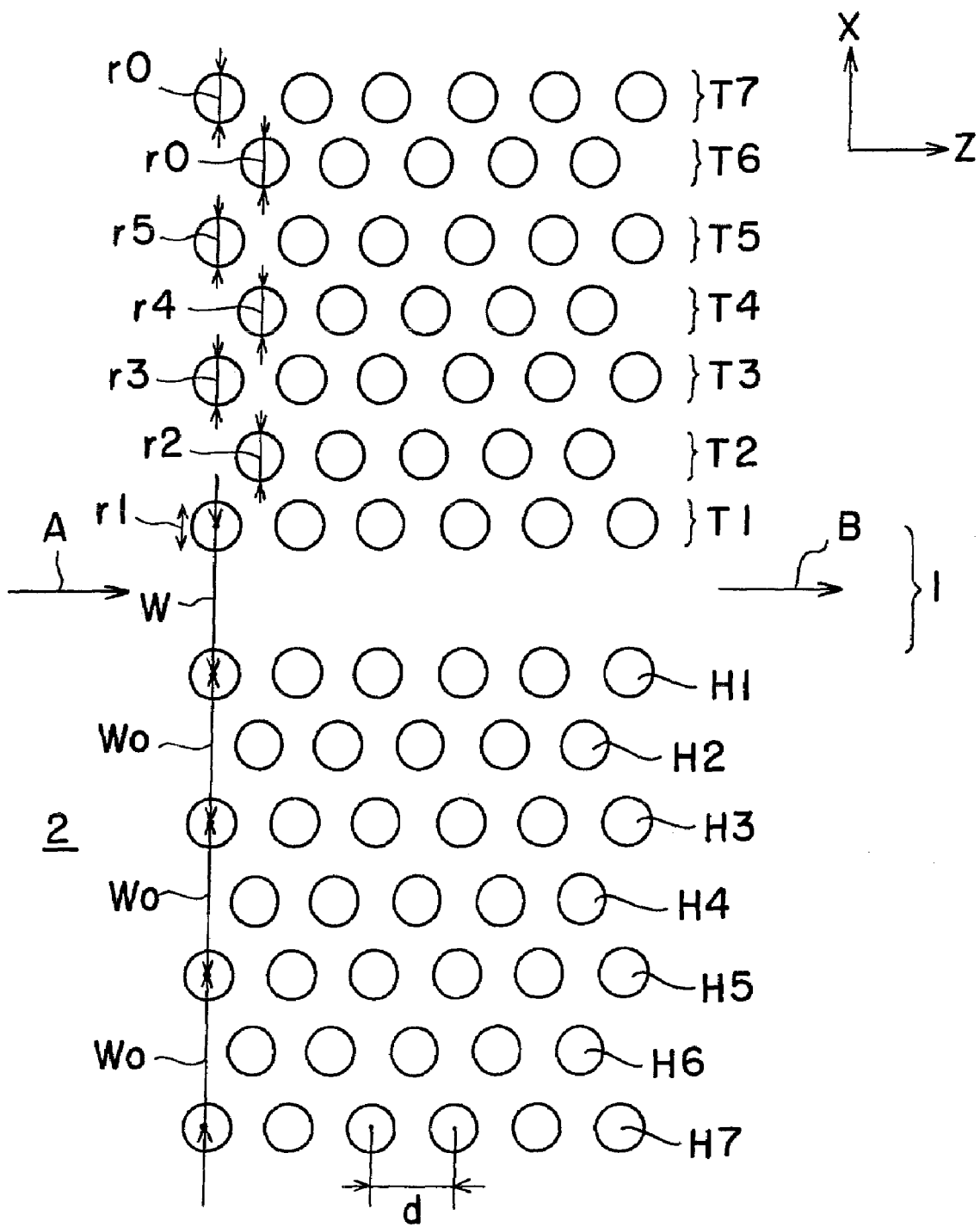
FIG. 1 is a plan view schematically showing a planar shape of an optical waveguide structure according to the present invention.

A photonic crystal is a multi-dimension and periodic structure having a periodicity comparable with a wavelength of light with a plurality of media having different refractive indices. The photonic crystal has a band structure of light similar to that of electron. Specific structure thus provides photonic band gap of light. The photonic crystal having the photonic band gap functions as an insulator of light.

Linear defects can be introduced into a photonic crystal having photonic band-gap for deteriorating its periodicity. It is thereby possible to form waveguide mode in a frequency region of the band-gap and to provide an optical waveguide confining light.

A slab-type two-dimensional photonic crystal defined as follows. That is, to a dielectric thin film slab, low dielectric pillars are provided at an appropriate two-dimensional period. Each dielectric pillar has a refractive index lower than that of the dielectric thin film slab and has a shape of a column or an equilateral polygon. The dielectric thin film slab is provided between a upper clad and a lower clad to provide the photonic crystal. The upper and lower dads have a refractive index lower than that of the dielectric film slab.

In the case that the two-dimensional photonic crystal is used as an optical waveguide, it is necessary to confine light perpendicular to the two-dimensional plane. Several methods have been proposed for fabricating optical waveguides, any method may be used in the present invention.

For example, so-called oxide clad two-dimensional slab-type photonic crystal is preferable because it is possible to easily produce the crystal of a large area. The oxide clad two-dimensional type photonic crystal is produced as follows. A thin film of a semiconductor of a high refractive index (refractive index of about 3 to 3.5) is formed on a dielectric material (oxide or polymer) of a low refractive index, in which a two-dimensional photonic crystal structure is fabricated.

Further, it may be produced a two dimensional slab photonic crystal of an oxide and clad type and of a high quality, by using a substrate of silicon dioxide ($SiO_2$) with a silicon (Si) thin film thereon. Such type of substrate is called as Silicon-On-Insulator (SOI).

For example, it may be applied a two-dimensional slab-type photonic crystal of air-bridge type. The crystal include the photonic crystal whose upper and lower sides faces air functioning as the upper and lower clads.

To a material of a dielectric thin film slab, silicon, germanium, gallium-arsenide series compounds, indium-phosphorous series compound or indium-antimony series compound.

Further, a dielectric pillar may be composed of silicon dioxide, polyimide series organic compound, epoxy series organic compound, acrylic series organic compound, air or vacuum.

It is necessary that the dielectric pillars are arranged to form regular lattices. Although the shape of the lattice is not particularly limited, triangular lattice and regular quadratic lattice are listed.

The present invention will be described further, referring to attached drawings.

According to the first and second inventions (refer to FIG. 1), dielectric pillars H1, H2, H3, H4 and H5 are included in lattice columns T1, T2, T3, T4 and T5 of n'th order (n represents 1, 2, 3, 4 and 5) with respect to an optical waveguide 1, respectively. Each of the dielectric pillars H1, H2, H3, H4 and H5 has an equilateral polygon or exact circle. Although the number of corners of the equilateral polygon is not limited, equilateral triangle, square, pentagon, hexagon or octagon is preferred. Further, the planar shape of the dielectric pillar may be made exact circle, production error is allowed. Specifically, the ratio of major axis/minor axis may preferably be 1.00±0.1 and more preferably be 1.0±0.05, considering limit and error of measurement, physical properties of the material and anisotropy of etching rate upon processing.

According to the first and second inventions, dielectric pillars H6, H7 . . . included in lattice columns T6, T7 . . . of n'th order (n represents 6 or more) with respect to an optical waveguide 1 may preferably have a planer shape of an equilateral polygon or exact circle. However, dielectric pillars having another planar shape such as ellipse may be included.

According to the first invention, at least one of sizes rn (n represents 2, 3, 4 and 5) of dielectric pillars included in lattice columns of n'th order with respect to an optical waveguide is different from a fundamental size ro. Preferably, at least one of sizes rn (n represents 2, 3 and 4) of dielectric pillars included in the lattice columns of n'th order with respect to the optical waveguide is different from the fundamental size ro. More preferably, at least one of sizes rn (n represents 2 and 3) of dielectric pillars included in lattice columns of n'th order with respect to the optical waveguide is different from the fundamental size ro. Most preferably, the size r2 of dielectric pillars included in the lattice columns of second order with respect to the optical waveguide is different from the fundamental size ro.

The fundamental size means a normal size of dielectric pillars regularly arranged in a slab-type two-dimensional photonic crystal. According to the first and second inventions, normally, the dielectric pillars H6, H7 . . . belonging to the lattice columns T6, T7 . . . of n'th order (n represents 6 or more) have a size of ro.

At least one of the sizes rn (n represents 2, 3, 4 or 5) included in the lattice columns of n'th order with respect to an optical waveguide may preferably be larger than ro and may be smaller than ro.

In the case that at least one of the sizes rn (n represents 2, 3, 4 or 5) of the dielectric pillars included in the lattice columns of n'th order with respect to an optical waveguide is larger than a fundamental size ro, the ratio (rn/ro) of rn with respect to ro may preferably be 1.01 or higher and more preferably be 1.03 or higher on the viewpoint of the present invention. Further, as rn/ro becomes too high, it becomes difficult to maintain a constant period. The ratio rn/ro may thus preferably be 1.5 or lower and more preferably be 1.2 or lower.

Further, according to a preferred embodiment, at least one of the sizes rn (n represents 2, 3, 4 and 5) of the dielectric pillars included in the lattice columns of n'th order with respect to an optical waveguide is larger than the sizes r(n−1) of the dielectric pillars included in the lattice columns of (n−1)'th order with respect to the optical waveguide. That is, the size of the dielectric pillar belonging to the outer lattice column is made larger than that of the dielectric pillar belonging to the inner and adjacent lattice column with respect to an optical waveguide. It is thus possible to further reduce the dependency of the properties on wavelength.

On the viewpoint, rn/r(n−1) may preferably be 1.02 or higher and more preferably be 1.05 or higher. However, as rn/r(n−1) becomes too high, it becomes difficult to maintain a constant regularity. The ratio rn/r(n−1) may preferably be 1.8 or lower and more preferably be 1.4 or lower.

The width W of an optical waveguide may be substantially same as a fundamental pitch Wo of the lattice columns.

Alternatively, the width W of an optical waveguide may be different from the fundamental pitch Wo of the lattice columns. The fundamental pitch Wo of the lattice columns means a fundamental pitch of the lattice columns constituting a base of a slab-type two-dimensional photonic crystal. The width W of an optical waveguide may be different from the fundamental pitch Wo of the lattice columns so that the dependency of properties on wavelength can be further reduced.

According to this embodiment, the value W/Wo may preferably be 0.7 or larger and more preferably be 0.8 or higher. Further, as the value W/Wo becomes too high, it becomes difficult to maintain a constant regularity W/Wo may preferably be 1.3 or lower and more preferably be 1.15 or lower.

Further, according to the second invention, the dielectric pillars included in the lattice columns of n'th order (n represents 1, 2, 3, 4 and 5) with respect to an optical waveguide have a planar shape of an equilateral polygon or exact circle. At least one of the sizes rn of the dielectric pillars included in the lattice columns of n'th order (n represents 1, 2, 3, 4 and 5) with respect to an optical waveguide is different from the fundamental size ro. Moreover, the width W of the optical waveguide is different from the fundamental pitch Wo of the lattice columns.

According to the second invention, at least one of the sizes rn (n represents 1, 2, 3, 4 and 5) of the dielectric pillars included in the lattice columns of n'th order with respect to an optical waveguide, respectively, is different from the fundamental size ro. Preferably, at least one of the sizes rn (n represent 1, 2, 3 and 4) of the dielectric pillars included in the lattice columns of n'th order with respect to an optical waveguide, respectively, is different from the fundamental size ro. More preferably, at least one of the sizes rn of the dielectric pillars included in the lattice columns of n'th order (n represents 1, 2 and 3) with respect to an optical waveguide is different from the fundamental size ro. Most preferably, the size r2 of the dielectric pillar included in the lattice column of the first or second order with respect to an optical waveguide is different from the fundamental size ro.

At least one of the sizes rn (n represents 1, 2, 3, 4 and 5) of the dielectric pillars included in the lattice columns of n'th order with respect to an optical waveguide, respectively, may be smaller than or may preferably be larger than the fundamental size ro.

In the case that at least one of the sizes rn (n represents 1, 2, 3, 4 and 5) of the dielectric pillars included in the lattice columns of n'th order with respect to an optical waveguide, respectively, is larger than the fundamental size ro, the ratio (rn/ro) of rn with respect to ro may preferably be 1.01 or higher and more preferably be 1.02 or higher on the viewpoint of the present invention. Further, as rn/ro is too high, it becomes difficult to maintain a constant period. rn/ro may thus preferably be 1.8 or lower and more preferably be 1.4 or lower.

In the case that at least one of the sizes rn of the dielectric pillars included in the lattice columns of n'th order (n represents 1, 2, 3, 4 and 5) with respect to an optical waveguide is smaller than the fundamental size ro, the ratio (rn/ro) of rn with respect to ro may preferably be 0.98 or lower and more preferably be 0.95 or lower on the viewpoint of the present invention. Further, as rn/ro is too low, it becomes difficult to maintain a constant period. The ratio rn/ro may thus preferably be 0.6 or higher and more preferably be 0.8 or higher.

According to the second invention, the width W of the optical waveguide is made different from the fundamental pitch Wo of the lattice columns. The fundamental pitch Wo of the lattice columns means a fundamental pitch of the lattice columns constituting a base of a slab-type two-dimensional photonic crystal. The width W of the optical waveguide may be made different from the fundamental pitch Wo of the lattice columns to further reduce the dependency of the properties on wavelength.

According to the second invention, the value of W/Wo may preferably be 0.7 or higher and more preferably be 0.8 or higher. However, as W/Wo is too high, it becomes difficult to maintain a constant regularity. W/Wo may thus preferably be 1.3 or lower and more preferably be 1.15 or lower.

The effects of the present invention will be described further in detail below.

The first and second inventions utilize PC-1 mode and applicable in the case that PC-1 mode is present within, or in the vicinity of, the photonic band.

Figure 8:
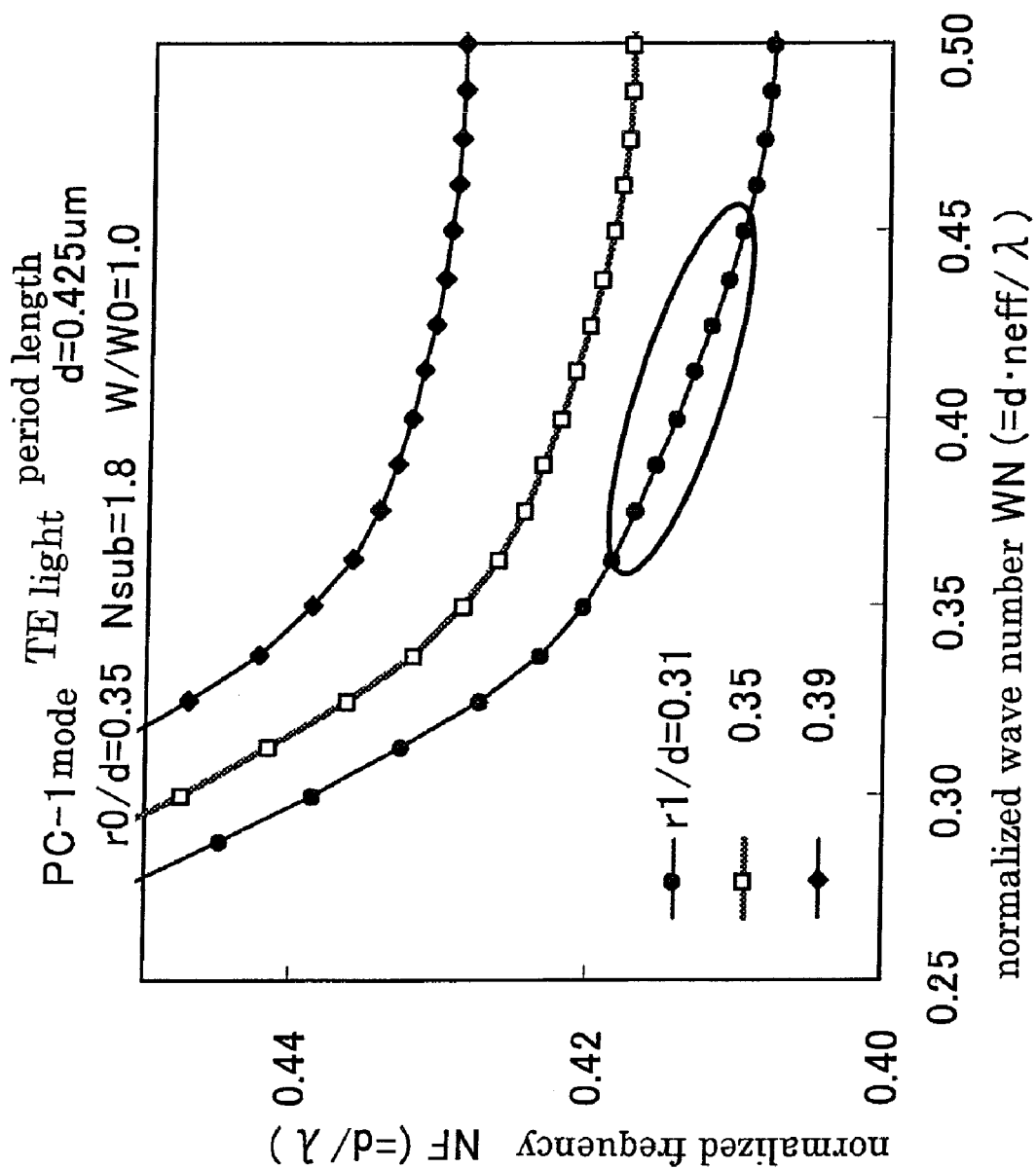
FIG. 8 is a graph showing the dependency of properties on frequency, in the case that W equals Wo and r1/d is changed with respect to ro in PC-1 mode.

FIG. 8 shows the band property in the case that W/Wo is 1.0. It is provided that ro/d is 0.35. The size r1 of the dielectric pillar H1 belonging to the lattice column T1 of the first column is changed with respect to ro. The case of r1/d=0.35 belongs to a prior art.

As can be seen from FIG. 8, the change of band properties is small when r1/d is changed to 0.31 or 0.39. However, in the case that r1/d is 0.31, it is proved that |δNF1| at a value WN of around 0.40 is smaller than that of WN<0.3 and the second-order derivative δNF2 is near 0 at a value WN at around 0.40. That is, it is proved that the dependency of GNeff (effective EO constant) on wavelength λ becomes zero in this region.

Figure 9:
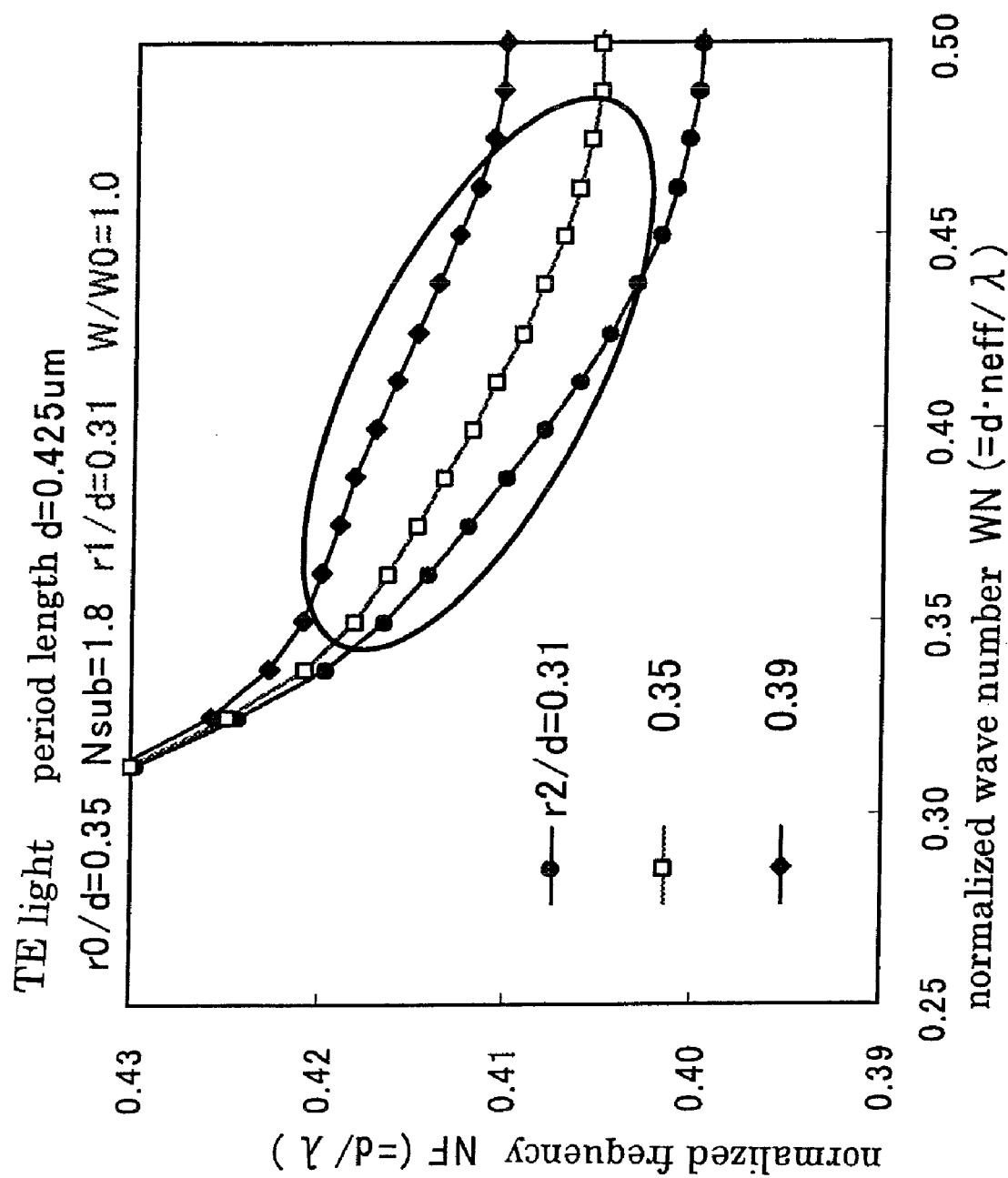
FIG. 9 is a graph showing the dependency of properties on frequency, in the case that W equals Wo, r1/d is fixed at 0.31 and r2/d is changed in PC-1 mode.

FIG. 9 shows the results in the case that r1/d is fixed at 0.31 and r2/d is changed. r1 is the size of the dielectric pillars included in the first lattice column with respect to the optical waveguide. r2 is the size of the dielectric pillars included in the second lattice column. It was found that the second order derivative of the slope was 0 or a negative value around WN value of 0.35 to 0.45, which was remarkable results.

Figure 10:
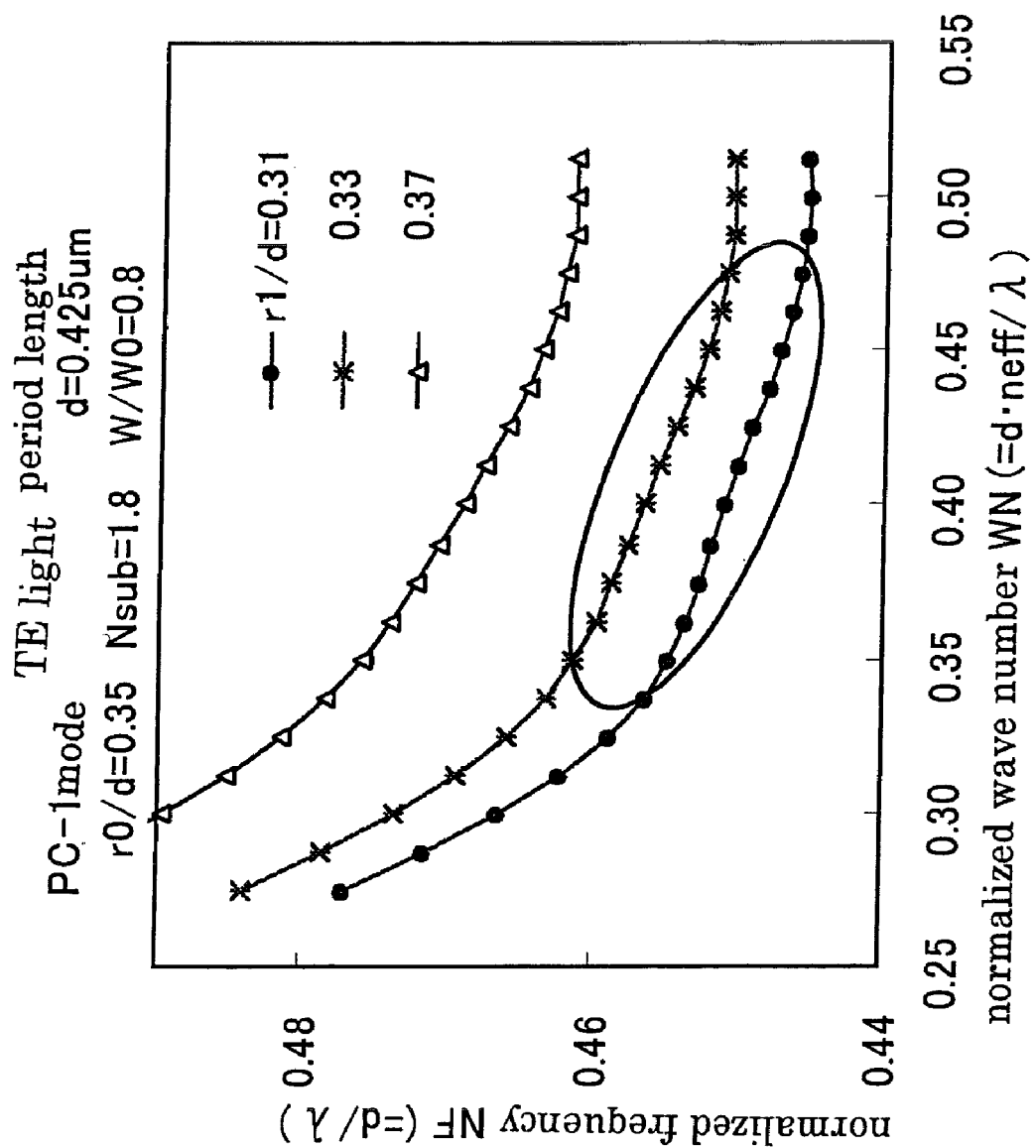
FIG. 10 is a graph showing the dependency of properties on frequency, in the case that W/Wo is fixed at 0.8 and r1/d is changed in PC-1 mode.

FIG. 10 shows the results of the case that W/Wo is lowered to 0.8. In the case that the size r1 of the dielectric pillars of the first lattice column is changed, it was found that the second-order derivative of the slope is shifted to a negative value especially when r1/d is lower than 0.35 (r1/d=0.31).

Figure 11:
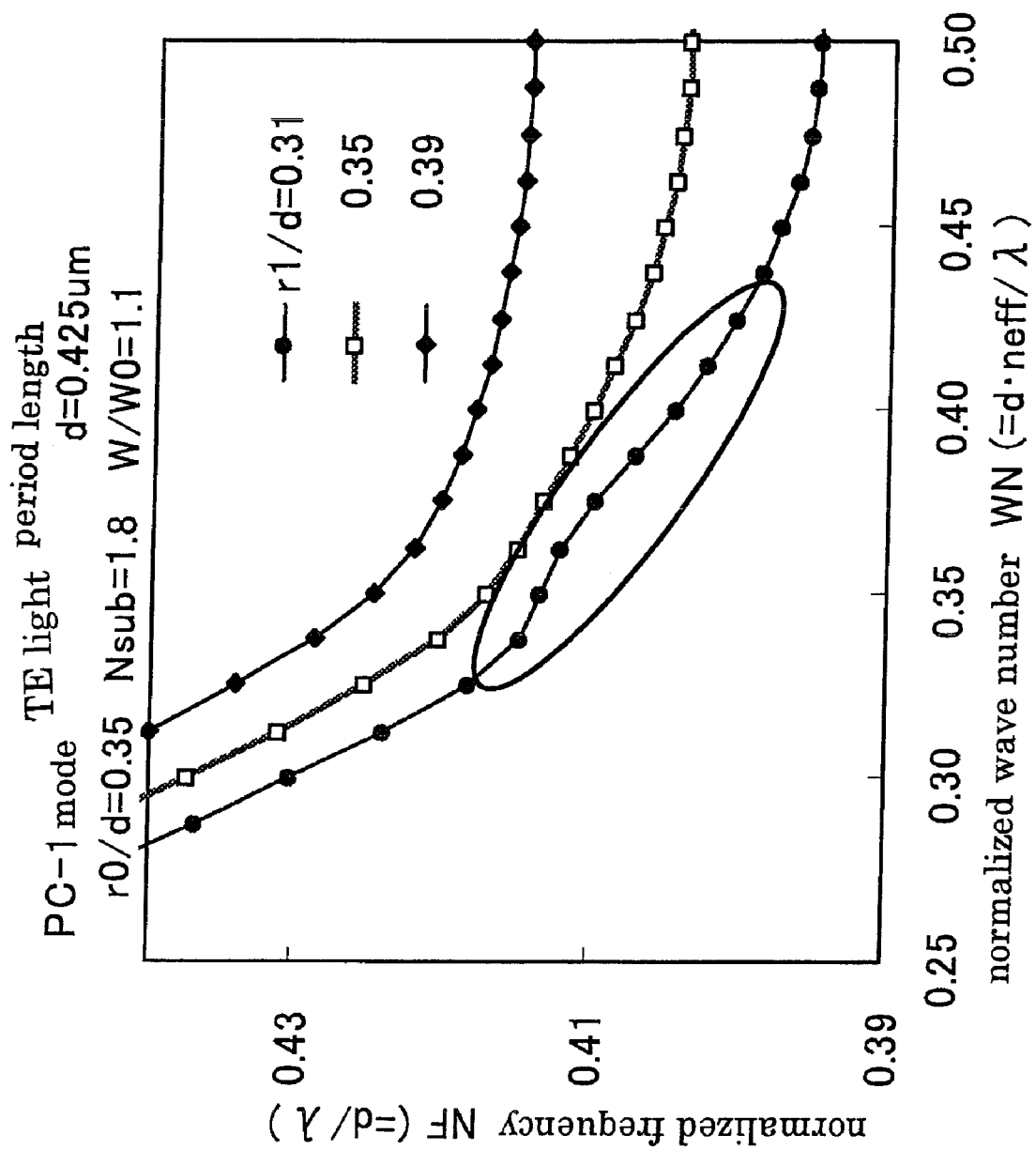
FIG. 11 is a graph showing the dependency of properties on frequency, in the case that W/Wo is fixed at 1.1 and r1/d is changed in PC-1 mode.

FIG. 11 shows the results of the case that W/Wo is as large as 1.1. In the case that the size r1 of the dielectric pillars of the first lattice column is changed, it was found that the second derivative of the slope is shifted to a negative value especially when r1/d is lower than 0.35 (r1/d=0.31).

According to the first and second inventions, owing to the above effects, the group refractive index (GNeff) and effective electro-optical constant of conduction properties are elevated and the dependency on wavelength is reduced.

Figure 7:
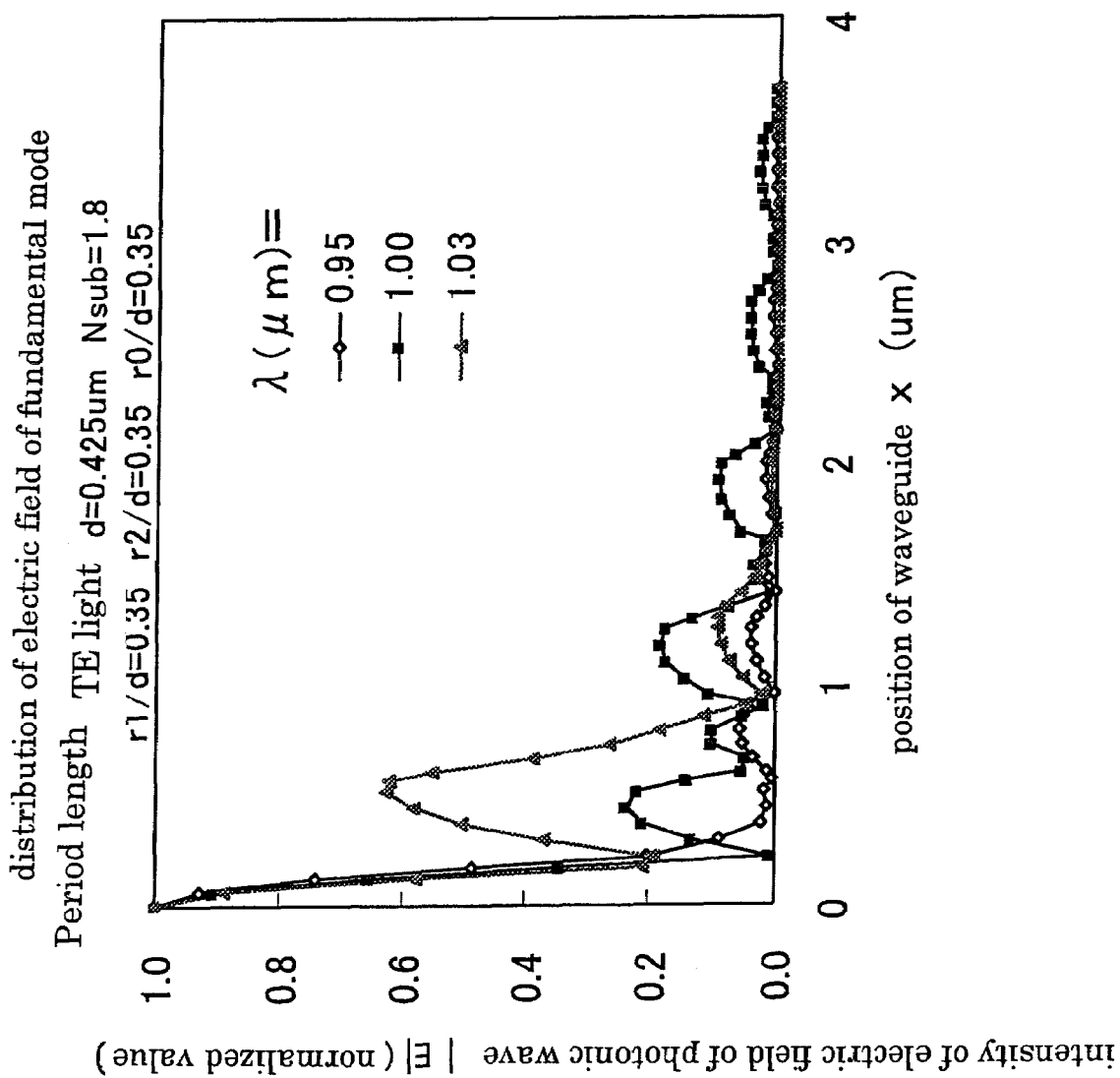
FIG. 7 is a graph showing relationship of a distance from an optical waveguide and an optical electric field intensity.

According to Japanese patent publication No. 2003-156642A, PC-2 mode is utilized on the viewpoint of assuring single mode property for reducing the loss of mode conversion in a curved waveguide. As shown in the Examples section, W/Wo is considerably different from 1 (W/Wo=0.7). According to PC-1 mode, the above condition would be out of photonic band or would be multi-mode, so that the above effects of the first and second inventions could not be obtained. Further, PC-1 mode is shown as "prior art" in FIGS. 7 and 12 of Japanese patent publication No. 2003-156642A. However, the reason is that the planar shape of the dielectric pillar was ellipse and the period length d and distance W of holes are shifted from constants do and Wo, respectively.

Besides, group refractive index GNeff and effective EO constant are defined as follows.

$$GNeff=c/[Neff-\lambda \cdot (\Delta Neff/\Delta \lambda)]$$

(c: velocity of light in vacuum, λ; wavelength, Neff; effective refractive index of guided light)

Effective EO constant=amount of change of effective refractive index of guided light/amount of change of refractive index of substrate (bulk)

The change of refractive index of a substrate (bulk) can be realized by, for example, Pockels effect, TO effect (change of refractive index due to temperature change), plasma effect (change of refractive index due to injection of current into a semiconductor), and the like.

The optical waveguide structure of the present invention can be applied to various kinds of functional devices.

That is, in addition to conventional optical waveguide, the optical waveguide structure may be applied to a device utilizing Pockels effect, a device utilizing plasma effect caused by injection of current, a device utilizing EO effects due to quantum well structure, a device utilizing TO effects due to change of heater temperature, a directional coupler, Mach-Zehnder optical waveguide and an optical modulator.

Figure 2:
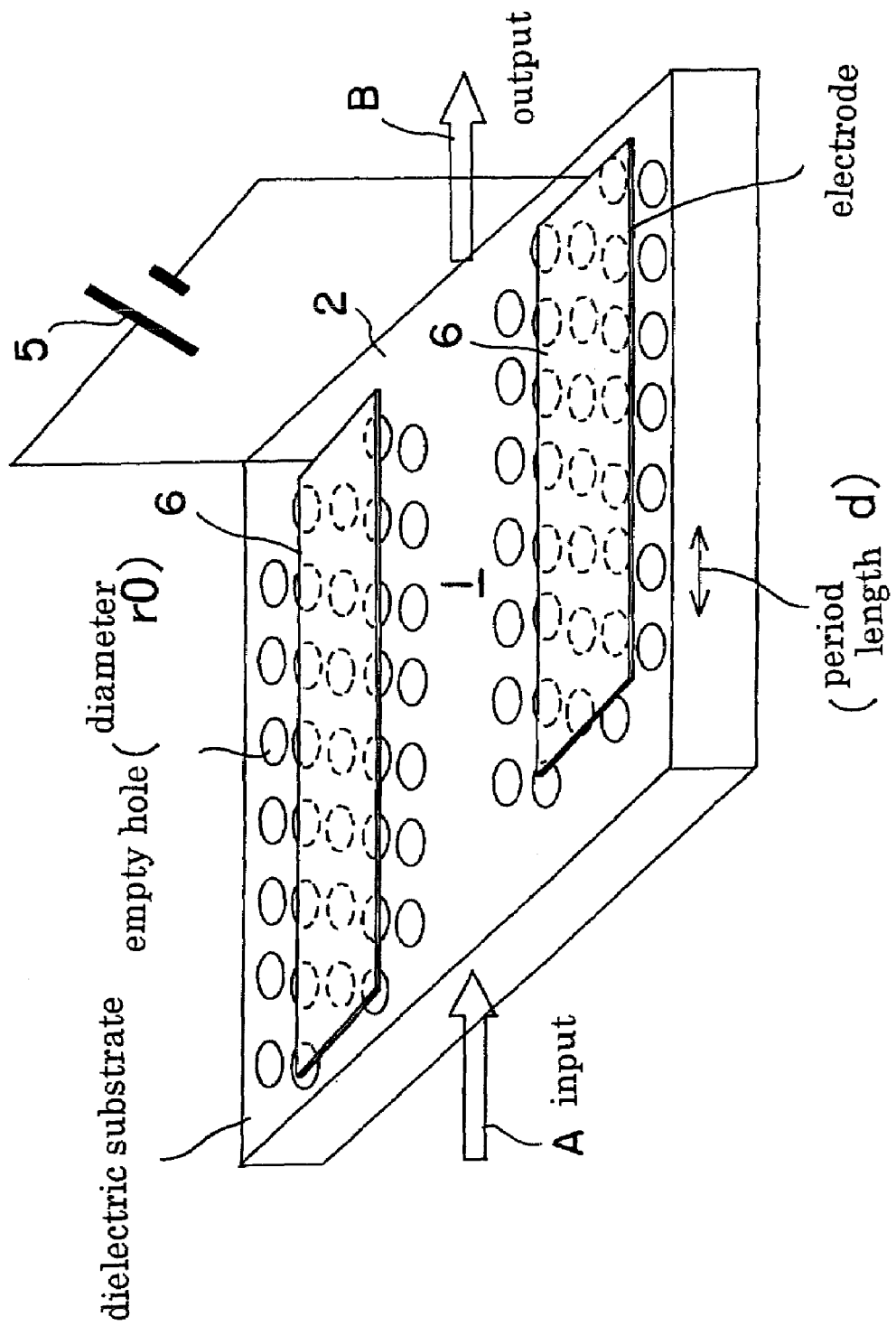
FIG. 2 is a perspective view schematically showing a device according to an embodiment of the present invention.
Figure 3:
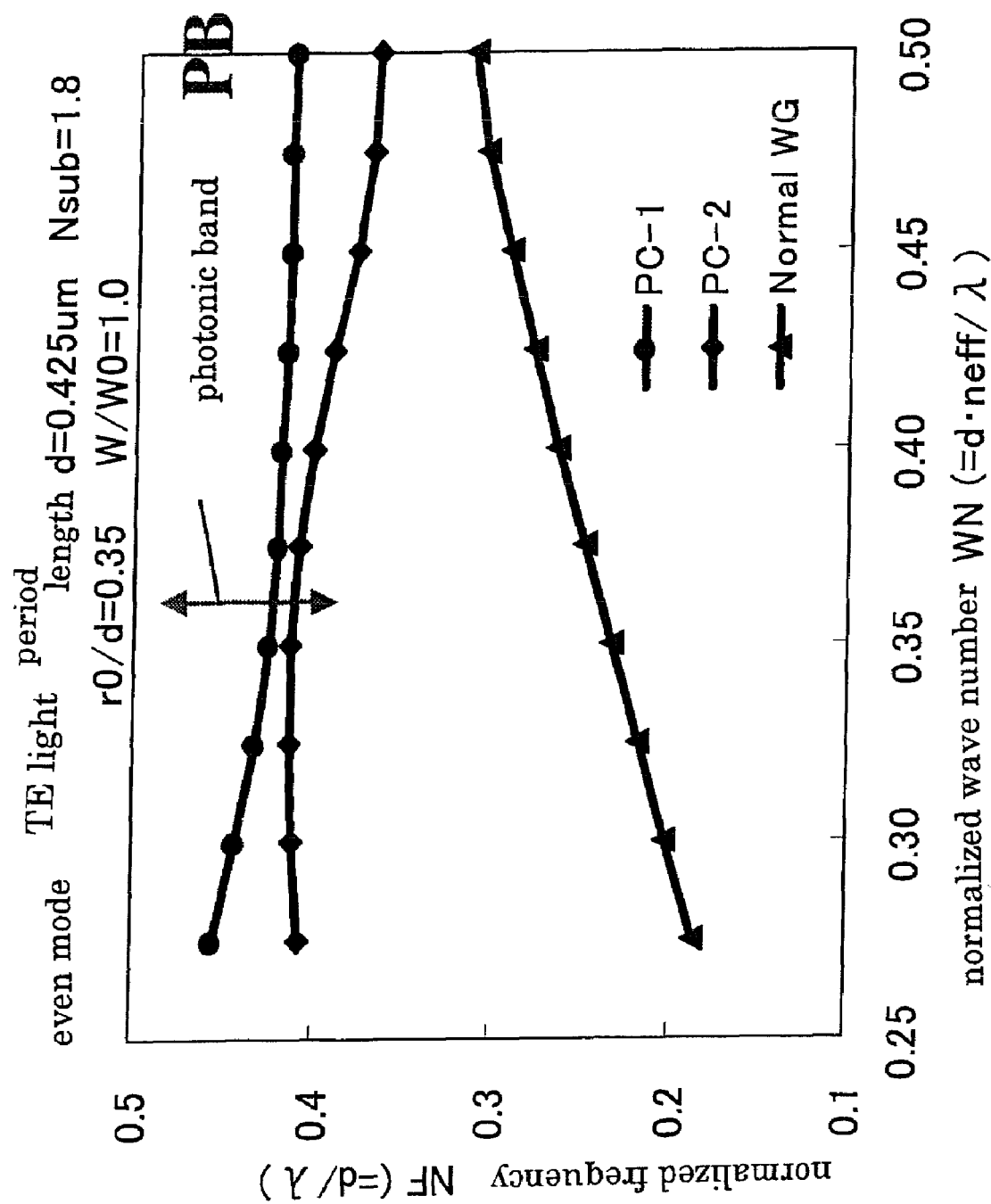
FIG. 3 is a graph showing the dependency of properties of even mode and TE light mode on frequency, in an optical waveguide structure of a prior design.
Figure 4:
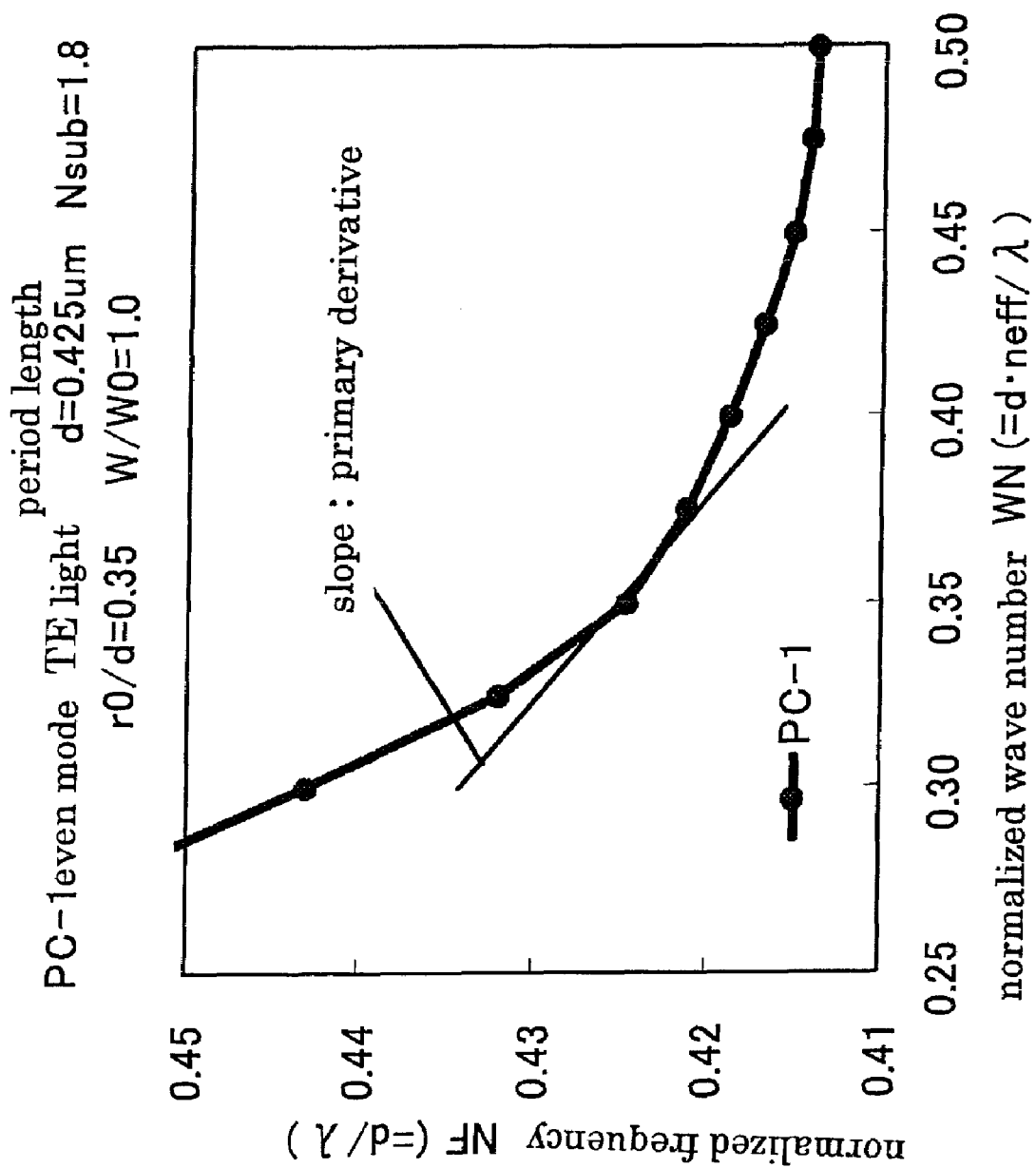
FIG. 4 is a graph showing the dependency of properties of PC-1 mode on frequency, in an optical waveguide structure of a prior design.
Figure 5:
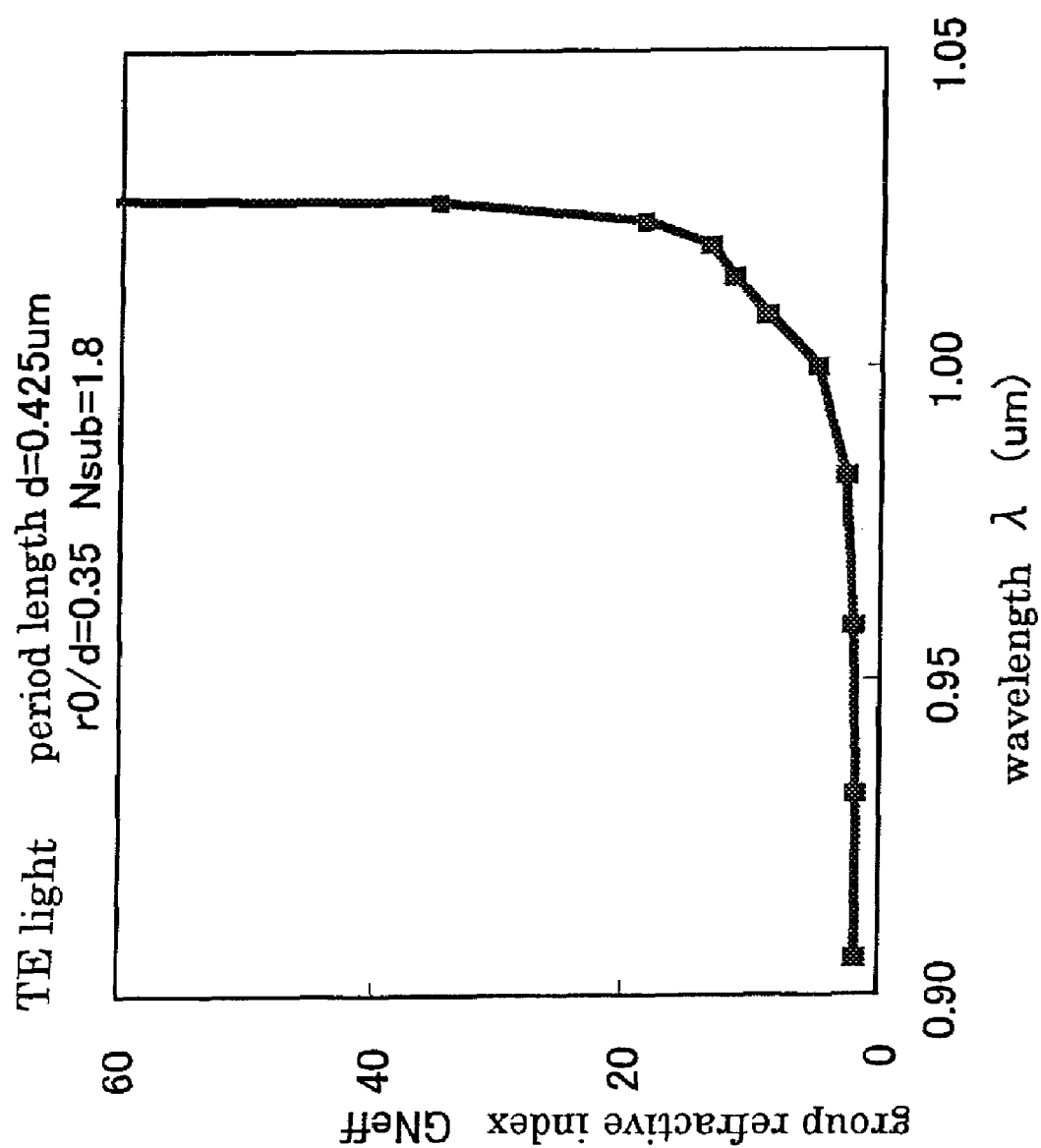
FIG. 5 is a graph showing the dependency of group refractive index, in an optical waveguide of a prior design.
Figure 6:
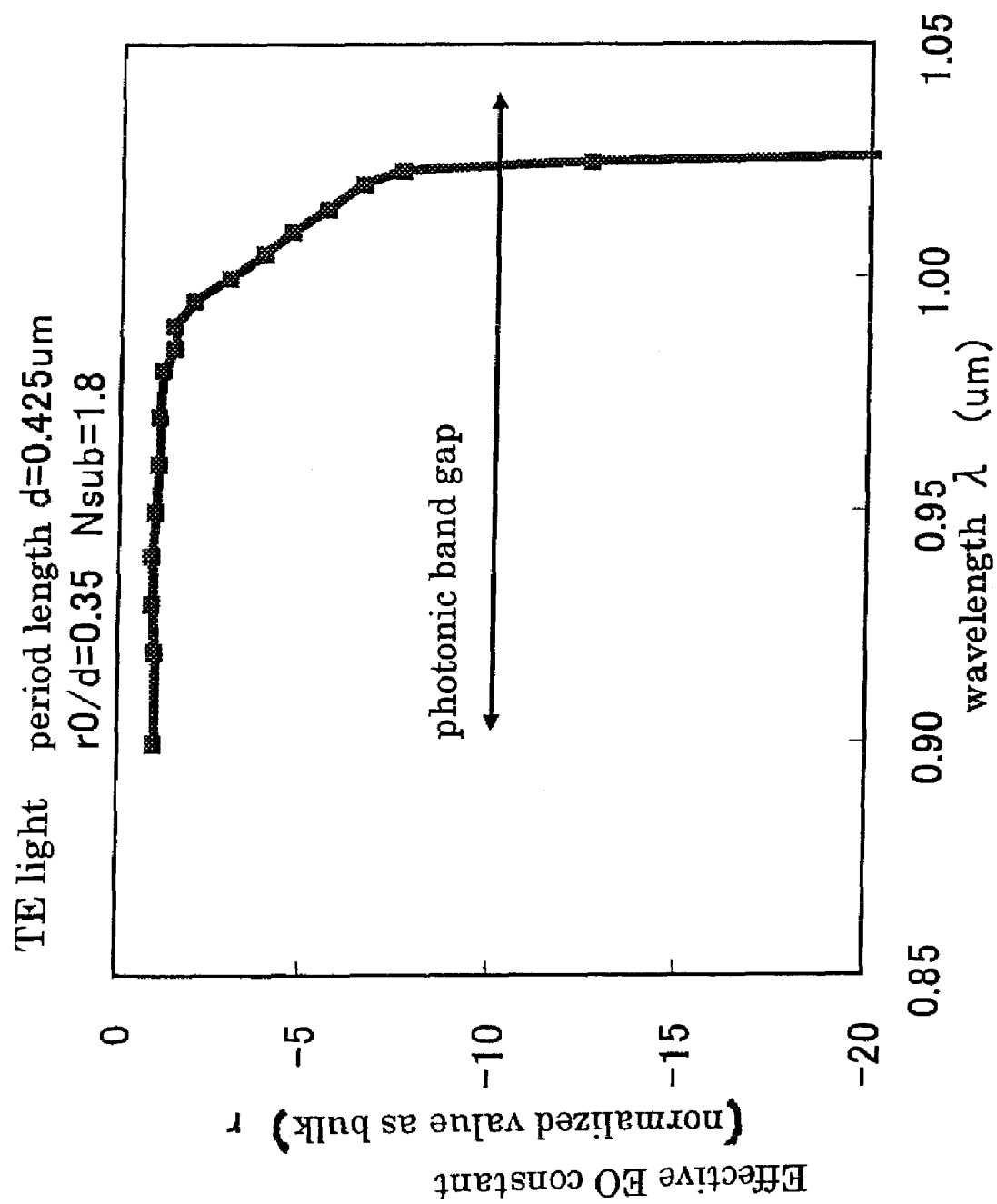
FIG. 6 is a graph showing the dependency of effective electro-optic constant on frequency, in a prior optical waveguide structure.

For example, FIG. 2 is a perspective view showing an optical functional device of photonic crystal of an outer voltage application structure. A pair of electrodes 6 are formed on a surface of a substrate 2, and a voltage is applied to the electrodes with a source 5. Light is made incident into an optical waveguide portion 1 as an arrow A and irradiated as an arrow B.

Figure 12:
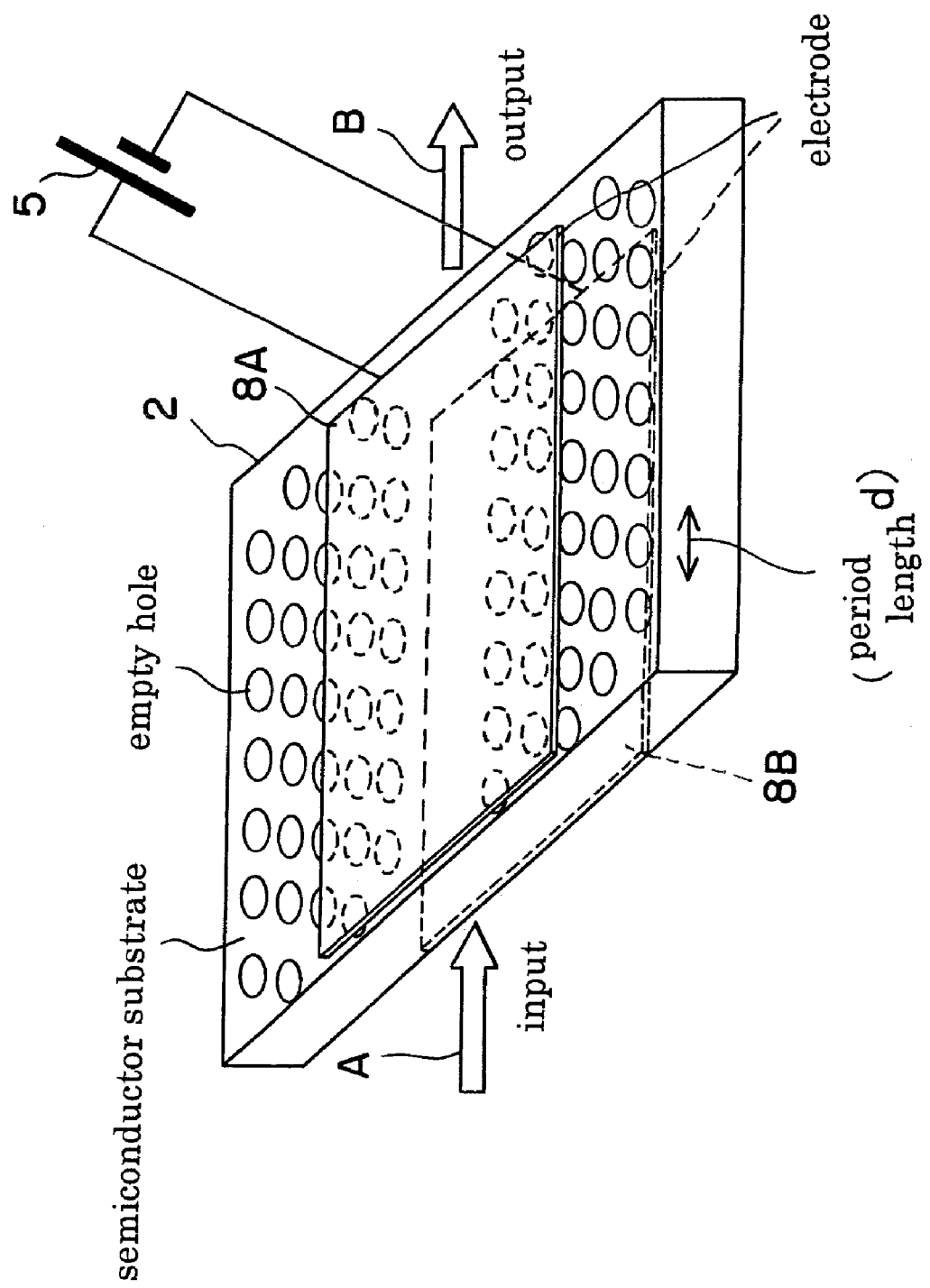
FIG. 12 is a perspective view schematically showing an example of a device to which the present invention is applicable.

For example, FIG. 12 is a perspective view showing an optical functional device of photonic crystal of an outer voltage application structure. A pair of electrodes 8A and 8B are formed on a surface and back face of a substrate 2, respectively, and a voltage is applied to the electrodes with a source 5. Light is made incident onto the optical waveguide portion 1 as an arrow A and irradiated as an arrow B.

In the case of a device of FIG. 12, a substrate 2 is made of, for example, a z-plate of a piezoelectric single crystal such as lithium niobate or lithium tantalite to utilize Pockels effect. Alternatively, the substrate 2 may be made of a semiconductor to utilize plasma effect due to injection of current or EO effect due to quantum well structure to modulate light. Further the structure may be utilized for a directional coupler or an optical circuit of Mach-Zehnder type waveguide.

Figure 13:
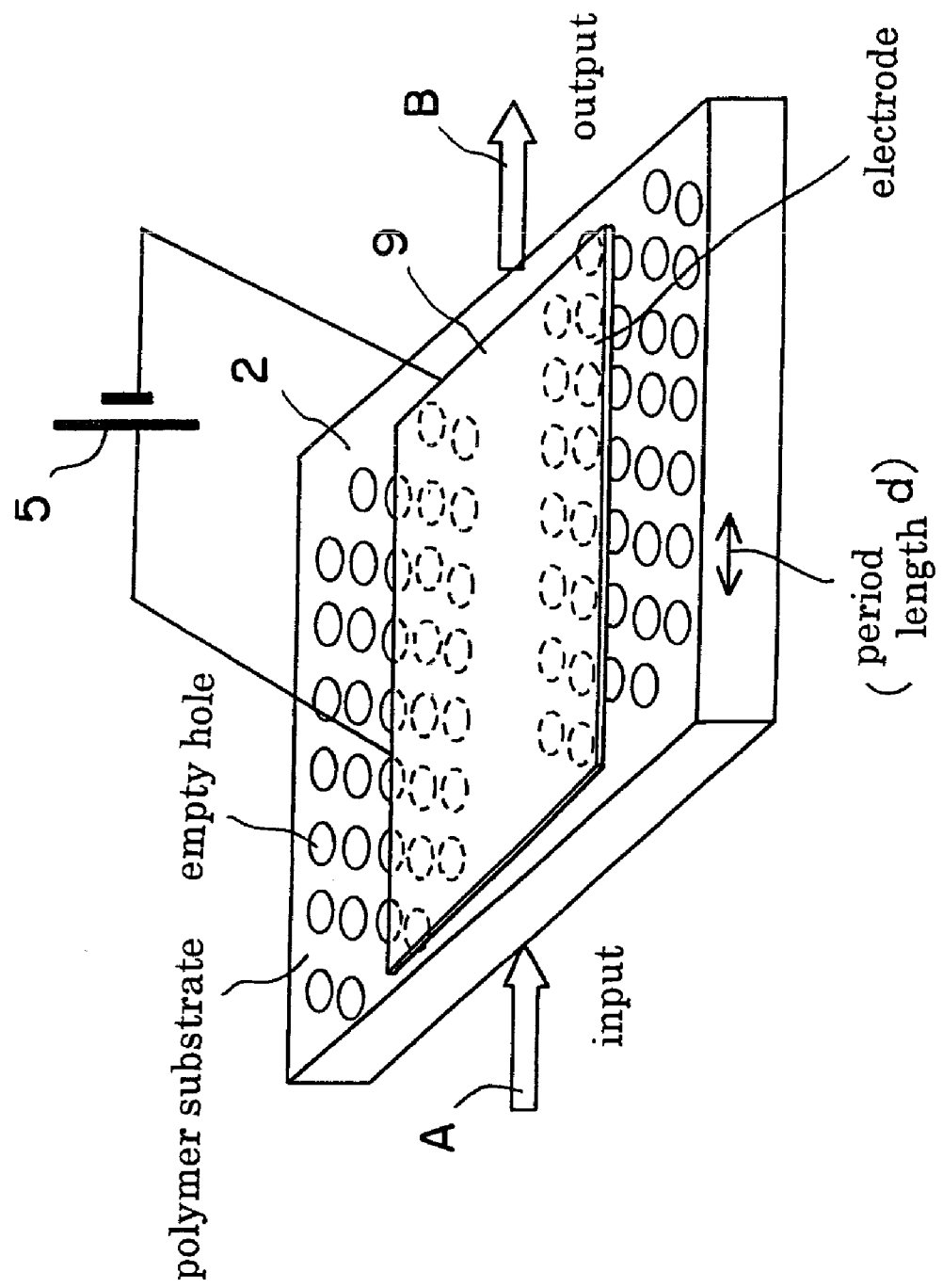
FIG. 13 is a perspective view schematically showing another example of a device to which the present invention is applicable.

FIG. 13 is a perspective view showing an optical functional device of photonic crystal of an outer voltage application structure. A film heater 9 is formed on the side of surface of the substrate 2 so that a voltage is applied on the film heater 9 with a source 5. Light is made incident into the optical waveguide portion 1 as an arrow A and irradiated as an arrow B. The substrate 2 is made of a polymer so that light is modulated with the film heater 9 utilizing TO effect.

The optical waveguide structure of the present invention is effective for electromagnetic waves. The above effects are thus obtainable for various kinds of electromagnetic waves other than light wave. Such electromagnetic waves include microwave and terahertz radiation.

The invention claimed is:

1. An optical waveguide structure comprising a slab type two-dimensional photonic crystal and a channel optical waveguide provided in said photonic crystal, said photonic crystal comprising a slab of a dielectric film and a plurality of lattice columns each comprising dielectric pillars;

wherein said dielectric pillars included in said lattice columns at least of n'th order (n represents 1, 2, 3, 4 and 5) in distance with respect to said channel optical waveguide have a planar shape of an equilateral polygon or exact circle; and wherein said slab of dielectric film exhibits an electro-optic effect, and said dielectric pillars included in at least one of said lattice columns of n'th order (n represents 2, 3, 4 and 5) in distance with respect to said channel optical waveguide has a size rn larger than a fundamental size ro, wherein each of said plurality of lattice columns extends along the longitudinal length of said channel optical waveguide, and wherein each of said dielectric pillars in the same lattice column of n'th order (n represents 1, 2, 3, 4 and 5) has the same size and said lattice columns are spaced from said channel optical waveguide in said photonic crystal.

2. The optical waveguide structure of claim 1, wherein said channel optical waveguide has a width W substantially equal to a fundamental pitch Wo of said lattice columns.

3. The optical waveguide structure of claim 1, wherein said channel optical waveguide has a width W different from a fundamental pitch Wo of said lattice columns.

4. The optical waveguide structure of claim 1, wherein said dielectric pillar included in said lattice colunm of first order in distance with respect to said channel optical waveguide has a size r1 smaller than a fundamental size ro.

5. An optical waveguide structure comprising a slab type two-dimensional photonic crystal and a channel optical waveguide provided in said photonic crystal, said photonic crystal comprising a slab of a dielectric film and a plurality of lattice columns each comprising dielectric pillars;

wherein said dielectric pillars included in said lattice columns at least of n'th order (n represents 1, 2, 3, 4 and 5) in distance with respect to said channel optical waveguide has a planar shape of an equilateral polygon or exact circle;

wherein said slab of dielectric film exhibits an electro-optic effect, and said dielectric pillars included in at least one of said lattice columns of n'th order (n represents 1, 2, 3, 4 and 5) in distance with respect to said channel optical waveguide has a size rn larger than a fundamental size ro;

wherein said channel optical waveguide has a width W different from a fundamental pitch Wo of said lattice columns, wherein each of said plurality of lattice columns extends along the longitudinal length of the said channel optical waveguide, wherein each of said dielectric pillars in the same lattice column of n'th order (n represents 1, 2, 3, 4 and 5) has the same size and said lattice columns are spaced from said channel optical waveguide in said photonic crystal.

6. The optical waveguide structure of claim 5, wherein said dielectric pillar included in said lattice column of first order in distance with respect to said channel optical waveguide has a size r1 smaller than a fundamental size ro.

7. The optical waveguide structure of claim 5, wherein said dielectric pillar included in said lattice column of n'th order in distance with respect to said channel optical waveguide has a size rn (n represents 2, 3, 4 and 5) larger than a size r(n−1) of said dielectric pillar included in said lattice colunm of (n−1)'th order in distance with respect to said channel optical waveguide.

* * * * *

UNITED STATES PATENT AND TRADEMARK OFFICE
CERTIFICATE OF CORRECTION

PATENT NO.         : 7,660,506 B2                                              Page 1 of 1
APPLICATION NO.    : 11/750515
DATED              : February 9, 2010
INVENTOR(S)        : Osamu Mitomi et al.

It is certified that error appears in the above-identified patent and that said Letters Patent is hereby corrected as shown below:

Title Page, Item (30) Foreign Application Priority Data:
please change "May 19, 2005" to --May 19, 2006--

Column 9
Line 32: please change "colunm" to --column--

Column 10
Line 13: please change "m" to --rn--
Line 19: please delete the second occurrence of "the"
Line 33: please change "colunm" to --column--

Signed and Sealed this

Twentieth Day of April, 2010

David J. Kappos
*Director of the United States Patent and Trademark Office*